US008798994B2

(12) United States Patent
Eckhart et al.

(10) Patent No.: US 8,798,994 B2
(45) Date of Patent: Aug. 5, 2014

(54) RESOURCE CONSERVATIVE TRANSFORMATION BASED UNSUPERVISED SPEAKER ADAPTATION

(75) Inventors: John W. Eckhart, Boca Raton, FL (US); Michael Florio, Lake Worth, FL (US); Radek Hampl, Praha (CZ); Pavel Krbec, Praha (CZ); Jonathan Palgon, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1665 days.

(21) Appl. No.: 12/026,960

(22) Filed: Feb. 6, 2008

(65) Prior Publication Data

US 2009/0198494 A1 Aug. 6, 2009

(51) Int. Cl.
*G01L 15/00* (2006.01)
*G10L 15/06* (2013.01)
*G10L 17/00* (2013.01)
*G10L 15/28* (2013.01)

(52) U.S. Cl.
USPC ........... 704/244; 704/234; 704/240; 704/243; 704/250; 704/255

(58) Field of Classification Search
USPC ............... 704/234, 240, 243, 244, 250, 255
See application file for complete search history.

(56) References Cited

U.S. PATENT DOCUMENTS

| 5,835,890 | A | * | 11/1998 | Matsui et al. | 704/255 |
|---|---|---|---|---|---|
| 6,208,964 | B1 | * | 3/2001 | Sabourin | 704/244 |
| 6,223,159 | B1 | * | 4/2001 | Ishii | 704/256.7 |
| 6,684,185 | B1 | * | 1/2004 | Junqua et al. | 704/243 |
| 6,789,061 | B1 | * | 9/2004 | Fischer et al. | 704/240 |
| 6,915,259 | B2 | | 7/2005 | Rigazio et al. | |
| 6,917,919 | B2 | | 7/2005 | Botterweck | |
| 2002/0087314 | A1 | * | 7/2002 | Fischer et al. | 704/255 |
| 2002/0091521 | A1 | * | 7/2002 | Yuk et al. | 704/240 |
| 2003/0220791 | A1 | | 11/2003 | Toyama | |
| 2004/0117183 | A1 | * | 6/2004 | Deligne et al. | 704/248 |
| 2005/0071162 | A1 | * | 3/2005 | Rockenbeck et al. | 704/236 |
| 2006/0074665 | A1 | * | 4/2006 | Astrov et al. | 704/256.1 |
| 2007/0129943 | A1 | * | 6/2007 | Lei et al. | 704/240 |
| 2008/0010057 | A1 | * | 1/2008 | Chengalvarayan et al. | 704/9 |

FOREIGN PATENT DOCUMENTS

EP  1205907 B1  5/2002

OTHER PUBLICATIONS

Huang et al, "Rapid Fea-ture Space Speaker Adaptation for Multi-Stream HMM-Based Audio-Visual Speech Recognition," IEEE Int'l Conf on Multimedia and Expo, pp. 338-341, 2005.*
Lei et al, "Robust Feature Space Adaptation for Telephony Speech Recognition," in Proc. ICSLP, 2006, pp. 1-4.*

(Continued)

*Primary Examiner* — Richemond Dorvil
*Assistant Examiner* — Olujimi Adesanya
(74) *Attorney, Agent, or Firm* — Patents on Demand P.A.; Brian K. Buchheit; Scott M. Garrett

(57) ABSTRACT

The present invention discloses a solution for conserving computing resources when implementing transformation based adaptation techniques. The disclosed solution limits the amount of speech data used by real-time adaptation algorithms to compute a transformation, which results in substantial computational savings. Appreciably, application of a transform is a relatively low memory and computationally cheap process compared to memory and resource requirements for computing the transform to be applied.

20 Claims, 2 Drawing Sheets

(56) References Cited

OTHER PUBLICATIONS

Pellom, "Sonic: The University of Colorado continuous speech recognizer," University of Colorado, Technical Report TR-CSLR-2001-01, 2001, pp. 1-56.*

W. Zhu, et al., "Recent Advances of IBM's Handheld Speech Translation System," in Proc. InterSpeech, 2006, pp. 1181-1184.*

Liu et al "Online speaker adaptation and tracking for real-time speech recognition", In Proceedings of the 9th European Conference on Speech Communication and Technology, pp. 281-284, Lisbon, Portugal, Sep. 2005.*

Li et al "Incremental on-line feature space MLLR adaptation for telephony speech recognition", in ICSLP 2002, International Conference on Spoken Language Processing, pp. 1-4.*

* cited by examiner

RESOURCE CONSERVATIVE TRANSFORMATION BASED UNSUPERVISED SPEAKER ADAPTATION

BACKGROUND

1. Field of the Invention

The present invention relates to the field of speech processing, and, more particularly, to resource conservative transformation based unsupervised speaker adaptation.

2. Description of the Related Art

A central concern of many modern speech recognition systems is an improvement of system accuracy. One accuracy improving technique is to dynamically adapt a speech recognition system to a speaker at runtime, which is referred to as unsupervised speaker adaptation. Unlike historic speaker characteristic learning techniques that often required extensive training interactions, unsupervised speaker adaptation occurs transparently as a background process during speech interactive sessions. Unsupervised speaker adaptation is a process that takes advantage of data available in an audio stream and a likelihood that a user of the system is providing input within a domain of the system. Unsupervised speaker adaptation can result in significant accuracy gains. Unsupervised speaker adaptation is one specific type of adaptive acoustic modeling.

FIG. 1 (prior art) provides an overview of an adaptation/normalization scheme 100. In the scheme, speech recognition can be viewed as a combination of feature vectors of a feature space 110 and acoustic models in a model space 130. A mismatch is given if both spaces 110, 130 do not belong to the same level 140-144. For instance, in the case of non-adaptive acoustic modeling, a strong mismatch can exist between test data $X_{Test}$ 132 and $\ominus_{Train}$ 134. This mismatch results in part of a requirement of a speaker independent automatic speech recognition (SI-ASR) to cope with a significant amount of variability in an acoustic signal. Variability results from different transmission channels, different ambient noise environments, different vocal characteristics among different speakers, and the like.

Scheme 100 shows these abstract data levels 140, 142, and 144. The goal of adaptation scheme 100 is to overcome the mismatch for a combination of feature vectors X and acoustic models $\ominus$ from different levels. The mismatch can be reduced in the feature space (e.g. normalization—illustrated by the left side of scheme 100) or in the model space (adaptation—illustrated by the right side of scheme 100). In normalization, approaches have to be applied to the training ($X_{Train}$) and test data ($X_{Test}$ 132) to gain maximum performance. Adaptation schemes modify the parameters of the acoustic model directly in order to reduce a mismatch. Adaptation schemes can be capable of reducing the mismatch between $X_{Test}$ 132 and $\ominus_{Train}$ 134 by (ideally) transforming $\ominus_{Train}$ 134 into 0 $\ominus_{Test}$ 136.

Current adaptation and normalization approaches can be categorized into two classes: the maximum a-posteriori (MAP) family and the transformation family. MAP follows the principle of Bayesian parameter estimation, where parameters of the acoustic model itself are modified. A MAP approach can involve a relatively huge number of parameters and a relatively huge amount of adaptation data to function. In contrast, a transformation approach transforms the feature vectors without affecting parameters of underlying acoustic or visual models (i.e., does not change Hidden Markov Model parameters).

The present invention is concerned with adaptation (from $\ominus_{Train}$ 134 to $\ominus_{Test}$ 136) using a transformation approach.

During a transformation approach, computing a transformation is a relatively resource intensive operation. One reason for this cost is that conventional transformation techniques require that feature vector data representing an entire speech utterance be cached in memory. In an embedded system, the transformation computation can take as long as twenty five percent of the utterance length (e.g., a four second utterance can have an associated transformation computation time of approximately one second). Additionally, conventional approaches generate a transformation as a percentage of an utterance length, which makes determining resource cost for creating the transformation an unpredictable endeavor. In comparison to costs for creating a transform used during unsupervised speaker adaptation, applying the transform is a relatively inexpensive process.

The high resource cost of implementing transformation based conventional speaker adaptation and the relative unpredictability of resource consumption have prevented unsupervised speaker adaptation from being implemented on resource constrained devices, such as mobile phones, media playing devices, navigation systems, and the like. Additionally, unsupervised speaker adaptation is often not implemented on more robust devices (e.g., desktops and notebooks) with adequate processing resources available, since unsupervised speaker adaptation resource consumption lowers device performance—making even robust computing devices appear sluggish or non-responsive. What is needed is a new, resource conservative technique for implementing unsupervised speaker adaptation principles, which will provide accuracy improvements without the hefty and unpredictable performance/resource costs.

SUMMARY OF THE INVENTION

The present invention discloses a solution for conserving computing resources when implementing transformation based adaptation techniques. The disclosed solution limits the amount of speech data used by real-time adaptation algorithms to compute a transformation, which results in substantial computational savings. Appreciably, application of a transform is a relatively low memory and computationally cheap process compared to memory and resource requirements for computing the transform to be applied.

It has been found that intelligently selecting a relatively small portion of an entire audio sample and computing a transformation from this sample achieves measurable accuracy improvements without incurring a severe penalty in computational and memory resources. When a "good" audio sample is selected for creating the transformation, accuracy is approximately equivalent to that achieved by using the entire utterance for computing the transformation. Feature vectors extracted from audio samples can, in various contemplated implementations, be selected from the first N portion of an utterance, the last N portion of an utterance, a middle N portion of an utterance, a random portion of an utterance, and the like (e.g., N/3 portion from the first part of the utterance, N/3 from the middle of the utterance, N/3 from the end of the utterance, etc.). Different selections can be more preferred than others depending upon a nature of the speech processing system and speaker specific characteristics. Additionally, adaptation creation parameters, such as sample size, can be user configured to achieve a desired balance between accuracy gains and performance cost.

The present invention can be implemented in accordance with numerous aspects consistent with the materials presented herein. One aspect of the present invention can include a speech enabled computing device that includes an audio transducer, a central processing unit, a data store, a speaker adaptation engine, and a speech recognition engine. The audio transducer can be configured to receive audio input. The central processing unit can be configured to execute programmatic instructions. The data store can be configured to store digitally encoded information. The speaker adaptation engine can generate real-time transforms for unsupervised speaker adaptation of utterances received through the audio transducer. Transforms generated by the speaker adaptation engine can utilize at most N amount of frames of feature vectors extracted from the audio to generate the transforms regardless of a size of the utterances for which the transforms are generated.

Another aspect of the present invention can include a method for performing transformational speaker adaptations. The method can include a step of identifying a configurable value N representing a maximum amount of frames of feature vectors extracted from the audio to be used when generating a transformation for an utterance regardless of utterance length. N amount of frames of feature vectors extracted from the input utterance can be cached for adaptation purposes. A transformation can be created from the cache including the N amount of frames of feature vectors extracted from the input utterance. The created transformation is applied to the utterance in a pre-processing stage performed for transform based speaker adaptation purposes before speech recognizing the adapted utterance.

Still another aspect of the present invention can include speaker adaptation software that includes a configurable parameter N, an utterance cache, an application generator, and an adaptation applicator. The configurable parameter N can represent a maximum amount of frames of feature vectors used to construct a transformation used for unsupervised speaker adaptation. The utterance cache can store at least N amount of frames of feature vectors extracted from the audio. The adaptation generator can generate a transformation in real-time using at most N amount of frames of feature vectors extracted from the audio of the utterance. The adaptation applicator can apply transformations generated by the adaptation generator. Use of the parameter N ensures that the speaker adaptation software is able to deterministically execute within a constraint regardless of an utterance size. The constraint can be a maximum utterance cache memory size, a processing time, and/or a maximum number of processing cycles consumed by the unsupervised speaker adaptation.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
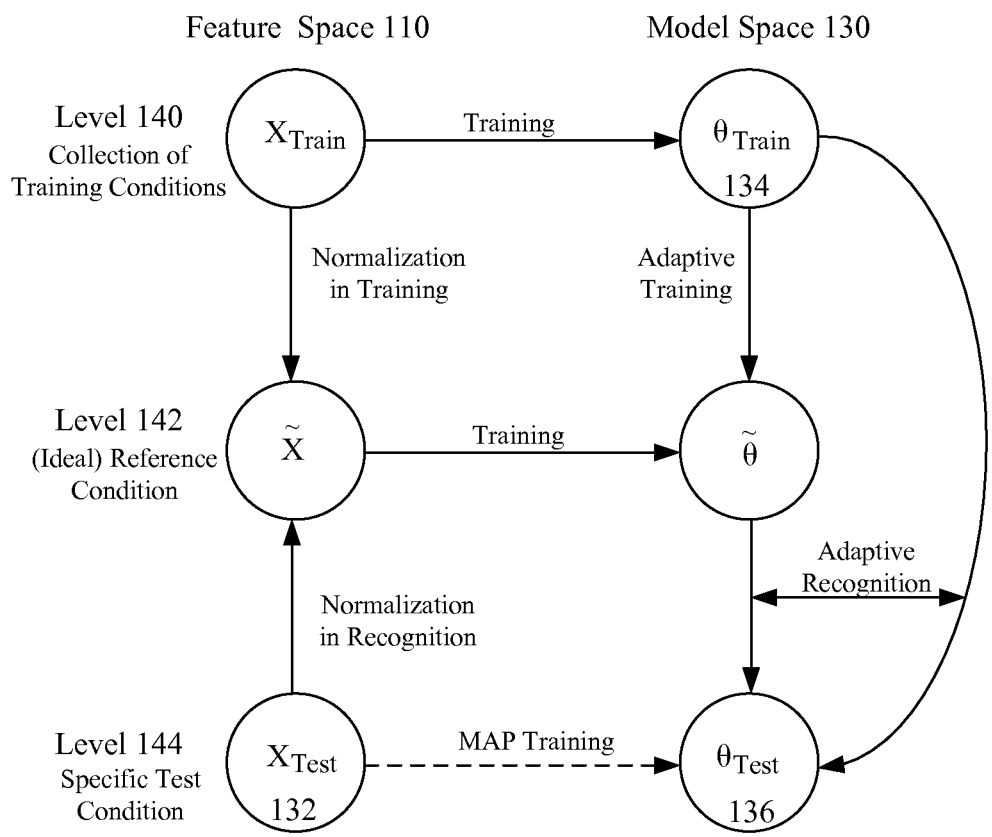
FIG. 1 (prior art) provides an overview of an adaptation/normalization scheme.
Figure 2:
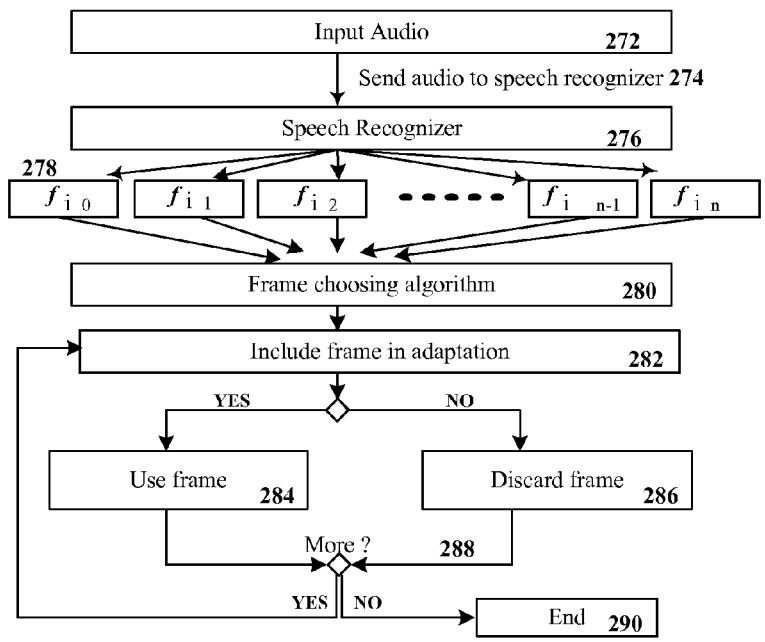
FIG. 2 is a schematic diagram of a resource conservative speaker adaptation system in accordance with an embodiment of the inventive arrangements disclosed herein.

FIG. 2 is a schematic diagram of a resource conservative speaker adaptation system 200 in accordance with an embodiment of the inventive arrangements disclosed herein. In system 200, audio input used by a speech processing system can be initially transferred in the frequency domain, where it is segmented into frames, which are labeled as speech or silence frames. A transformation can be applied on the feature vectors (MFCC) of the speech frames. During speech recognition processing, feature vector information that is extracted from the audio input can be cached. After a current speech recognition result is produced for a portion of the audio input, a new transformation that is to be applied to the next utterance can be calculated. This calculation can be performed by aligning the most recent recognition result with the cached feature vector information. Then, using a selection algorithm, N amount of the feature vector data can be selected. This N amount of data can be used to create the transformation.

System 200 utilizes a relatively small portion (e.g., N) of available feature vector data to generate the transformation. Resource savings using the small portion can be significant since processing (CPU), temporary memory (RAM), persistent memory, and/or other resources consumed by the system 200 are directly proportional to a size of the sample used to produce the transform. Criteria for selecting frames and additional adaptation constraints can be imposed on system 200. For example, a data store containing user and/or application configured parameters can be accessed to determine frame selection criteria and/or constraints.

Various types of frame selection criteria can specify which frames are to be used, as shown in selection algorithm sample 260. Frame selection algorithms can include, for example, a first N frame algorithm 261, a last N frame algorithm 262, a middle N frame algorithm 263, a random frame algorithm 264, and the like. It should be emphasized that any algorithm can be utilized and that algorithms 261-264 are provided for illustrative purposes only. For example, an algorithm that selects N/2 from a first half of the frames and N/2 from a second half of the frames can be used instead of any of the illustrative algorithms 261-264 in one contemplated embodiment.

The first N frame algorithm 261 can use frames from a beginning of the utterance. Once N has been reached, there is no need to cache more frames. Use of the last N frame algorithm 262 can use frames from an end of an utterance, where incoming speech frames can be cached, but frames older than a limit N are discarded. The middle frame algorithm 263 can be advantageous since these middle frames will typically contain more speech data than the initial or end frames. Incoming frames can be cached and discarded (up to N frames) until the middle N frames are obtained, after which there is no need to cache more frames. The random algorithm 264 can randomize a location of each frame used for adaptation purposes while maintaining frame order. A sample implementation of the randomizer is expressed in algorithm example 266. Different frame selection mechanisms can be performed in different situations.

Regardless of the type of selection criteria used, it should be appreciated that a number of frames used for adaptation purposes can be throttled to N frames, unlike conventional unsupervised speaker adaptation techniques where the number of frames is a percentage of an utterance. Thus, a size of the cache 234 can be fixed so long as the cache is of sufficient size for containing N frames. Additionally, use of N frames can result in predictable resource consumptions and processing times for unsupervised speaker adaptation related processes. In one embodiment, the adaptation constraints can be specified in terms of resource consumptions (e.g., cache size, maximum adaptation processing time, and the like). These constraints can be user and/or system configured. In an example showing of system configured constraints, a resource monitor can analyze available resources (e.g., CPU load, available memory, etc.) and can dynamically adjust the constraints to match. Thus, when a system is under a substantial processing load, the adaptation process can be throttled more severely (N decreased) than when system is under a standard load. Additionally, although N can represent a maximum number of frames selected for unsupervised speaker adaptation, this number can be decreased for smaller utterances to further reduce an amount of calculation necessary for generating the transformation.

Flow chart 270 pictorially illustrates a process for selecting frames for adaptation, which can be programmatically implemented in system 200. In process 270, audio input 272 can be sent 274 to a speech recognizer 276 for processing. The processor 276 can segment 278 the input into a plurality of frames, a portion of which are selected by a frame choosing algorithm 280. A decision 282 can be made as to whether to include feature vectors associated with each frame in a cache. When a frame is selected for use, feature vectors associated with that frame can be used 284 to generate the transformation. Otherwise the frame is discarded 286 and not used to generate the transformation. After each frame is processed, a decision 288 of whether to process additional frames for adaptation purposes can be made. For example, when less than N frames have been added to a cache 234, the process can process additional frames, shown by looping from decision 288 to decision 282 in the flow chart for process 270. When sufficient frames have been selected, the process 270 can end 290 and the transformation can be generated using cached feature vectors from selected frames.

Many different adaptation approaches can be used in system 200 that include a Maximum Likelihood Linear Regression (MLLR) based adaptation approach and a Maximum a Posterior Linear Regression (MAPLR) based adaptation approach. In one embodiment, software can generate the transformation in a post-processing stage, whereby the generated transformation is applied to the next utterance.

The components of system 200 can in one embodiment be components residing and executing within a speech enabled computing device. This device can include a small footprint operating system for which software performing the adaptations can be configured. The speech enabled device can be a resource limited device, such as a mobile phone, a personal data assistant, a navigation system, an embedded device, and the like. As such, it can be extremely beneficial to throttle resource consumptions during adaptation through use of configurable parameter N since this permits maximum resource consumption and processing time thresholds to be deterministically established regardless of utterance length. The speech enabled device can include a number of typical components, not explicitly shown in FIG. 2, such as an audio transducer, a central processing unit, a user interface, and the like.

It should also be appreciated that the components need not reside within a single speech enabled computing device, but can be distributed over a computing space. For example, an unsupervised speaker adaptation process can be performed within middleware as a Web service in one contemplated implementation. When speech processing components are distributed, data can be exchanged among components over a network, which can be wired or wireless, packet or circuit based, point-to-point or client-server, and can include a wide area network as well as a personal area network. Even though resource consumptions can be less critical for resource rich adaptation situations, such as those performed by a server or robust computing device, the added predictability of constraining the adaptation creation process using a configurable value of N input frames can be advantageous in many circumstances.

For example, an unsupervised speaker adaptation service can typically use a conventional percentage of utterance approach until a load threshold is reached, at which time processing is throttled using a maximum of N frames during the transformation creation stage. This permits a dynamic savings of resources, which reduces load, while having a relatively minimal effect on accuracy.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for performing unsupervised speaker adaptations in a resource conservative speaker adaptation system, the method comprising:

configuring a value N representing a maximum amount of frames of feature vectors extracted from an utterance for generating a transformation for the utterance regardless of utterance length, wherein configuring the value N comprises:

monitoring the availability of one or more processing resources associated with the system, defining resource constraints based on the availability of the one or more processing resources, wherein the resource constraints is an amount of at least one of time, memory, and computer processing cycles available for speaker adaptation purposes, and automatically configuring the value N based on the defined resource constraints that are met, wherein monitoring, defining and configuring are performed dynamically to ensure that unsupervised speaker adaptation processes are able to be performed deterministically within the defined resource constraints;

caching N amount frames of feature vectors extracted from the utterance for unsupervised speaker adaptation purposes;

creating a transformation from the cache including N amount frames of feature vectors of the utterance; and applying the created transformation during an unsupervised speaker adaptation process.

2. The method of claim 1, further comprising:

locally performing the identifying, caching, creating and applying steps within a speech-enabled computing device using local computing resources when performing said steps.

3. The method of claim 2, further comprising:

receiving a user specified input through a user interface of the speech-enabled computing device; and configuring the value N based upon the user specified input.

4. The method of claim 2, wherein the speech-enabled computing device is at least one of a portable computing device and an embedded computing device including a small footprint operating system upon which speech recognition and speaker adaptation processes execute.

5. The method of claim 1, wherein the unsupervised speaker adaptation is performed dynamically in real time.

6. The method of claim 2, further comprising:

establishing a user configured value for at least one resource constraint, wherein the resource constraint is at least one of a maximum cache memory size for storing the feature vectors, a processing time for conducting unsupervised speaker adaptation processes, and a maximum number of processing cycles consumed by unsupervised speaker adaptation processes; and determining the value N based upon the user configured value.

7. The method of claim 1 further comprising automatically configuring the value N based on the utterance length.

8. The method of claim 1, further comprising:

selecting a frame choosing algorithm from one of a plurality of available algorithms; and wherein the N frames used to create the adaptation are chosen by the selected frame choosing algorithm.

9. The method of claim 8, wherein the plurality of available algorithms comprise at least two algorithms selected from a group of algorithms comprising a First N algorithm that selects a first N frame of the input utterance, a Last N algorithm that selects a last N frame of the input utterance, a Middle N algorithm that selects frames from approximately a middle of the input utterance, and a Random algorithm that randomizes a selection of N frames chosen for the utterance while maintaining frame order.

10. A speech enabled computing device comprising:

an audio transducer configured to receive audio input;

a central processing unit configured to execute programmatic instructions;

a data store configured to store digitally encoded information;

an unsupervised speaker adaptation engine comprising a set of programmatic instructions stored within the data store and configured to be executed by the central processing unit, wherein said speaker adaptation engine is configured to generate real-time transformations for unsupervised speaker adaptation of utterances received through the audio transducer, wherein transformations generated by the speaker adaptation engine utilize at most N amount of frames of feature vectors extracted from the utterances to generate the transformations regardless of a size of the utterances for which the transforms are generated, wherein a value N for the N amount of frames is determined by:

monitoring the availability of one or more processing resources associated with the device, defining resource constraints based on the availability of the one or more processing resources, wherein the resource constraints is an amount of at least one of time, memory, and computer processing cycles available for speaker adaptation purposes, and automatically configuring the value N based on the defined resource constraints that are met, wherein monitoring, defining and configuring are performed dynamically to ensure that unsupervised speaker adaptation processes are able to be performed deterministically within the defined resource constraints.

11. The speech enabled computing device of claim 10, wherein N is a user configurable value.

12. The speech enabled computing device of claim 10, further comprising:

a user interface for establishing at least one user configured value for at least one constraint, wherein said constraint is at least one of a maximum cache memory size for storing the feature vectors, a processing time for conducting unsupervised speaker adaptation processes, and a maximum number of processing cycles consumed by unsupervised speaker adaptation processes, wherein the value of N is determined based upon the user configured value for the at least one constraint.

13. The speech enabled computing device of claim 10, wherein use of the value N ensures that speaker adaptation performed by the speech enabled computing device is able to deterministically execute within a device specific constraint regardless of an utterance size, wherein said constraint comprises at least one of a maximum utterance cache memory size, a processing time, and a maximum number of processing cycles, and wherein said speech enabled device comprises at least one of a mobile phone, a navigation device, a personal data assistant, and a digital media player.

14. The speech enabled computing device of claim 10, further comprising:

a small footprint operating system for which the unsupervised speaker adaptation engine is configured.

15. A computer program product for performing unsupervised speaker adaptations in a resource conservative speaker adaptation system, the computer program product comprising:

a non-transitory computer usable medium having computer usable program code embodied therewith, the computer usable program code comprising:

computer usable program code for configuring value N representing a maximum amount of frames of feature vectors extracted from an utterance to be used when generating a transformation for the utterance regardless of utterance length, wherein configuring the value N comprises:

monitoring the availability of one or more processing resources associated with the system, defining resource constraints based on the availability of the one or more processing resources, wherein the resource constraints is an amount of at least one of time, memory, and computer processing cycles available for speaker adaptation purposes, and automatically configuring the value N based on the defined resource constraints that are met, wherein monitoring, defining and configuring are performed dynamically to ensure that unsupervised speaker adaptation processes are able to be performed deterministically within the defined resource constraints;

computer usable program code configured to cache N amount frames of feature vectors extracted from the utterance for unsupervised speaker adaptation purposes;

computer usable program code configured to create an transformation from the cache including N amount frames of feature vectors of the utterance; and computer usable program code configured to apply the created transformation during an unsupervised speaker adaptation process.

16. The computer program product of claim 15, the computer program product further comprising:

computer usable program code configured to locally perform the identifying, caching, creating and applying operations within a speech-enabled computing device using local computing resources when performing said operations.

17. The computer program product of claim 16, the computer program product further comprising:

computer usable program code configured to receive a user specified input through a user interface of the speech-enabled computing device; and computer usable program code configured to configure the value N based upon the user specified input.

18. The computer program product of claim 16, wherein the speech-enabled computing device is at least one of a portable computing device and an embedded computing device including a small footprint operating system upon which speech recognition and speaker adaptation processes execute.

19. The computer program product of claim 15, the computer program product further comprising:

computer usable program code configured to establish a user configured value for at least one constraint, wherein said constraint is at least one of a maximum cache memory size for storing the feature vectors, a processing time for conducting unsupervised speaker adaptation processes, and a maximum number of processing cycles consumed by unsupervised speaker adaptation processes; and computer usable program code configured to determine the value N based upon the user configured value.

20. The computer program product of claim 15, the computer program product further comprising:

computer usable program code configured to select a frame choosing algorithm from one of a plurality of available algorithms, wherein the N frames used to create the adaptation are chosen by the selected frame choosing algorithm, and wherein the plurality of available algorithms comprise at least two algorithms selected from a group of algorithms comprising a First N algorithm that selects a first N frame of the input utterance, a Last N algorithm that selects a last N frame of the input utterance, a Middle N algorithm that selects frames from approximately a middle of the input utterance, and a Random algorithm that randomizes a selection of N frames chosen for the utterance while maintaining frame order.

* * * * *